(12) United States Patent
Serri (10) Patent No.: US 10,413,941 B2
(45) Date of Patent: Sep. 17, 2019

(54) MOTOVIBRATOR WITH CONTINUOUS ADJUSTMENT OF THE ANGULAR OFFSET OF THE ECCENTRIC MASSES

(71) Applicant: ITALVIBRAS—GIORGIO SILINGARDI—SOCIETA' PER AZIONI, Fiorano Modenese (IT)

(72) Inventor: Giuseppe Serri, Serramazzoni (IT)

(73) Assignee: ITALVIBRAS—GIORGIO SILINGARDI—SOCIETA' PER AZIONI, Fiorano Modenese (IT)

( * ) Notice: Subject to any disclaimer, the term of this patent is extended or adjusted under 35 U.S.C. 154(b) by 95 days.

(21) Appl. No.: 15/853,167

(22) Filed: Dec. 22, 2017

(65) Prior Publication Data
US 2018/0178252 A1 Jun. 28, 2018

(30) Foreign Application Priority Data
Dec. 23, 2016 (IT) .............................. UA2016A9425

(51) Int. Cl.
| | |
|---|---|
| B06B 1/16 | (2006.01) |
| F16H 1/46 | (2006.01) |
| F16H 35/00 | (2006.01) |
| B07B 1/42 | (2006.01) |
| B07B 1/28 | (2006.01) |

(52) U.S. Cl.
CPC .............. *B06B 1/167* (2013.01); *B06B 1/161* (2013.01); *B07B 1/42* (2013.01); *F16H 1/46* (2013.01); *F16H 35/008* (2013.01); *B07B 1/284* (2013.01)

(58) Field of Classification Search
CPC .. B06B 1/67; B06B 1/161; B07B 1/42; B07B 1/284; F16H 1/46; F16H 35/008
See application file for complete search history.

(56) References Cited

U.S. PATENT DOCUMENTS

| 1,459,841 | A | * | 6/1923 | Mitchell | ................... | B06B 1/16 |
| | | | | | | 209/367 |
| 3,036,471 | A | * | 5/1962 | Peterson | ................. | B06B 1/167 |
| | | | | | | 366/128 |
| 3,286,991 | A | * | 11/1966 | Pellegatti | ................ | E04G 21/08 |
| | | | | | | 366/123 |
| 4,472,980 | A | * | 9/1984 | Wadensten | .......... | B01F 11/0002 |
| | | | | | | 366/126 |
| 2006/0154774 | A1 | * | 7/2006 | Naude | ..................... | F16H 29/04 |
| | | | | | | 475/16 |

(Continued)

FOREIGN PATENT DOCUMENTS

GB  2113348 A  8/1983

*Primary Examiner* — Zakaria Elahmadi
(74) *Attorney, Agent, or Firm* — Cantor Colburn LLP (57) ABSTRACT

A motovibrator with continuous adjustment of the angular offset of the eccentric masses includes a substantially box containment body which accommodates electric motor elements which have a stator that is integral with the body and a rotor for the rotational actuation of a shaft about its own longitudinal axis. The opposite ends of the shaft protrude from the body and are each associated with at least one respective eccentric mass. The shaft includes a main section and a secondary section mutually aligned along the longitudinal axis, the main section being actuated rotationally directly by the rotor, and are coupled rotationally by interposition of transmission elements.

9 Claims, 6 Drawing Sheets

(56) References Cited

U.S. PATENT DOCUMENTS

| | | | | |
|---|---|---|---|---|
| 2008/0257088 | A1* | 10/2008 | Tesar | F16H 1/28 |
| | | | | 74/438 |
| 2009/0031839 | A1* | 2/2009 | Shimizu | F16H 1/46 |
| | | | | 74/421 A |
| 2011/0272332 | A1* | 11/2011 | Chang | B07B 1/42 |
| | | | | 209/364 |
| 2012/0301221 | A1* | 11/2012 | Ackermann | E01C 19/282 |
| | | | | 404/75 |
| 2013/0260952 | A1* | 10/2013 | Matsuda | F16H 57/082 |
| | | | | 475/346 |
| 2014/0326088 | A1* | 11/2014 | Burton | B06B 1/161 |
| | | | | 74/87 |
| 2017/0333947 | A1* | 11/2017 | Hausladen | E02D 7/18 |
| 2018/0043396 | A1* | 2/2018 | Bellec | B06B 1/161 |
| 2018/0056774 | A1* | 3/2018 | Chan | B60K 7/0007 |
| 2018/0076687 | A1* | 3/2018 | Pritchard | H02K 11/33 |
| 2018/0283503 | A1* | 10/2018 | Georgiev | F16H 3/56 |

* cited by examiner

MOTOVIBRATOR WITH CONTINUOUS ADJUSTMENT OF THE ANGULAR OFFSET OF THE ECCENTRIC MASSES

CROSS-REFERENCE TO RELATED APPLICATIONS

This application is related to and claims the benefit of Italian Patent Application No. 102016000130472, filed on Dec. 23, 2016, the contents of which are herein incorporated by reference in their entirety.

TECHNICAL FIELD

The present disclosure relates to a motovibrator with continuous adjustment of the angular offset of the eccentric masses.

BACKGROUND

Conventional motovibrators are essentially constituted by an electric motor in which the stator is accommodated within a casing and the rotor rotates integrally with a shaft that is coupled to one or more eccentric masses, the rotation of which generates controlled vibrations which are transmitted to the follower element of a machine in which the motovibrator is integrated. In particular, motovibrators are known which are provided with a shaft that passes through the rotor on the stator and are coupled at the opposite ends to respective eccentric masses.

For some applications, typically linked to the screening of materials, it is required to be able to modify the relative angular position of the eccentric masses keyed to the ends of the shaft in order to be able to modify consequently the spatial distribution of the vibrations transmitted to the follower element to which the motovibrator is applied.

In order to achieve this functionality, solutions are known in which at least one of the eccentric masses is "clamped" to the rotating shaft, with the possibility of continuous adjustment of its angular position around the rotation axis of said shaft, or which allow the possibility to apply additional secondary masses in predefined angular positions on a main eccentric mass.

Both of these solutions require the manual intervention of a specialized operator who, when the machine is not moving, intervenes manually to modify the angular position of the eccentric mass with respect to the rotation axis of the shaft or to apply or remove the additional secondary masses to/from the main eccentric mass or move them to a different angular position. After each adjustment it is necessary to restart the machine and check that the operation is the desired one; if it is not, the adjustment must be repeated by proceeding by successive attempts.

These solutions of the known type are not free from drawbacks, which include the fact that in order to perform the adjustment of the angular offset of the eccentric masses arranged at the mutually opposite ends of the rotating shaft it is necessary to stop the machine in which the motovibrator is incorporated, interrupting its production process, with consequent inefficiencies and increase in production costs.

Besides, the need to proceed by successive attempts further increases the execution times of these adjustment interventions, worsening the inefficiencies mentioned above.

It is also noted that an adjustment intervention performed by successive attempts is always approximate, particularly in the case of motovibrators with additional secondary masses on the eccentric masses which can be only moved to predetermined positions.

Moreover, these known solutions, by not allowing the execution of "dynamic" adjustments, in real time and continuous, force the machines in which they are incorporated to operate in conditions which are sometimes not optimum, until a new adjustment is performed, penalizing their performance.

Furthermore, the execution of these adjustment interventions entails the use of specialized and expert labor in view of the delicate nature of the operations to be performed.

SUMMARY

The aim of the present disclosure is to eliminate the drawbacks noted above by providing a motovibrator with continuous adjustment of the angular offset of the eccentric masses that allows to intervene to modify the relative angular position of the eccentric masses and consequently the distribution of the produced vibrations without interrupting the operation of the machine in which the motovibrator is incorporated, in order to avoid penalizing the efficiency of the corresponding production process.

Within this aim, the present disclosure provides an adjustment that is automated, without requiring particular experience of the operator in performing it.

The present disclosure does not require the execution of successive attempts because it is possible to check in real time, visually or by means of automatic monitoring systems, the outcome of the adjustment performed.

The present disclosure also allows a continuous adjustment of the angular position of the eccentric masses.

The present disclosure further provides a structure that is simple, relatively easy to provide in practice, safe in use, effective in operation and relatively modest in cost.

These advantages and features which will become better apparent hereinafter are achieved by providing the present motovibrator with continuous adjustment of the angular offset of the eccentric masses, comprising a substantially box-like containment body which accommodates electric motor means which comprise a stator that is integral with said body and a rotor for the rotational actuation of a shaft about its own longitudinal axis, the opposite ends of the shaft protruding from the body and being each associated with at least one respective eccentric mass, characterized in that said shaft comprises a main section and a secondary section, which are mutually aligned along said longitudinal axis, the main section being actuated rotationally directly by said rotor, and are coupled rotationally by interposition of transmission means which comprise a first epicyclic stage which is provided with a first sun gear rotationally actuated by said main section and a first annular element that is integral with said body, between which multiple first planetary gears are interposed which are supported rotationally by a first planet carrier, and a second epicyclic stage which is provided with a second planet carrier which is rotationally actuated by said first planet carrier and supports a plurality of second planetary gears which are interposed between a second annular element, which can be actuated rotationally about said longitudinal axis, and a second sun gear, which is coupled rotationally to said secondary section, the rotational actuation of the second annular element being adapted to vary continuously the relative angular position of the secondary section with respect to the main section and therefore the angular offset of the corresponding eccentric masses during the rotation of said sections.

BRIEF DESCRIPTION OF THE DRAWINGS

Further characteristics and advantages of the present disclosure will become better apparent from the detailed description of a preferred but not exclusive embodiment of a motovibrator with continuous adjustment of the angular offset of the eccentric masses, illustrated by way of non-limiting example in the accompanying drawings, wherein.

DETAILED DESCRIPTION OF THE DRAWINGS

Figure 1:
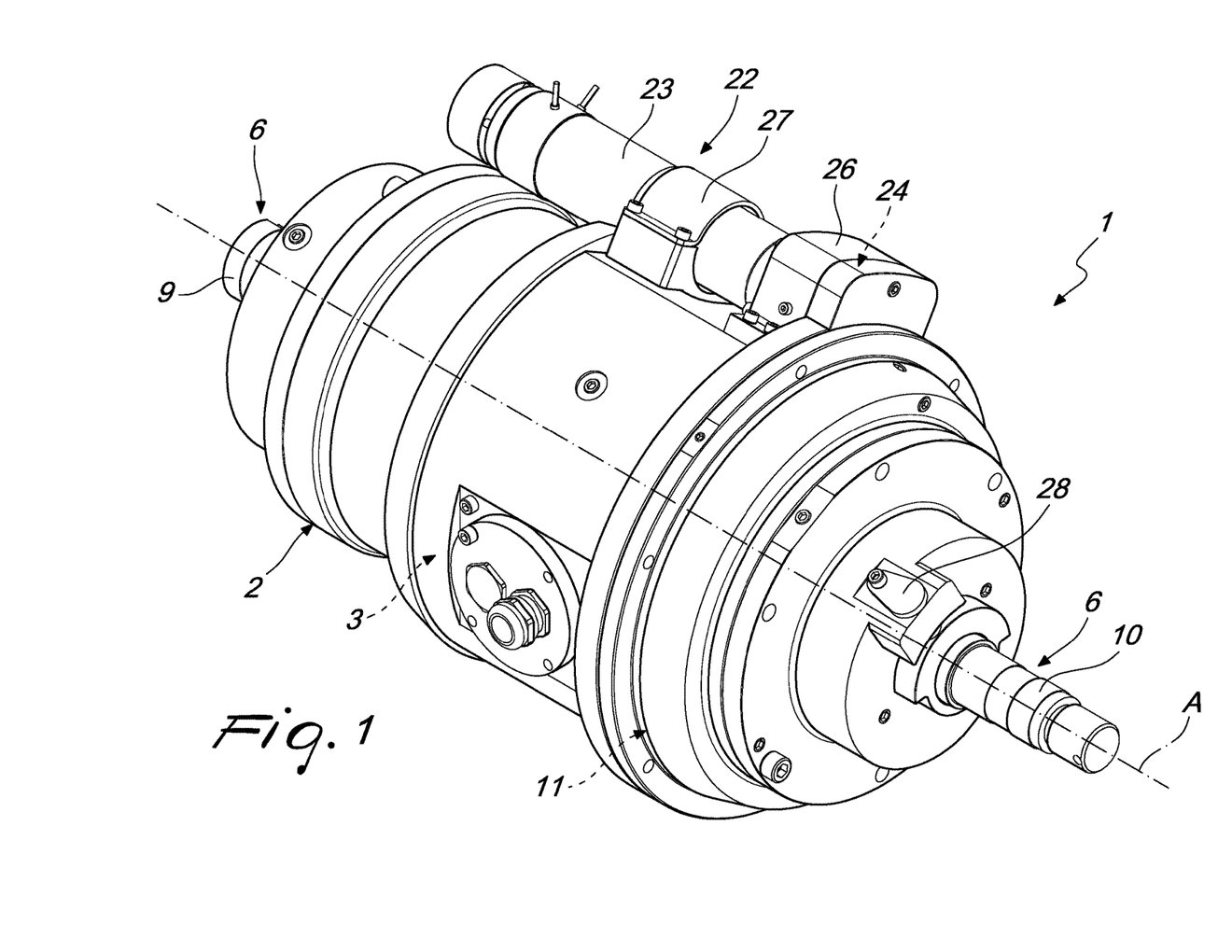
FIG. 1 is a schematic perspective view of a motovibrator with continuous adjustment of the angular offset of the eccentric masses according to the disclosure.
Figure 2:
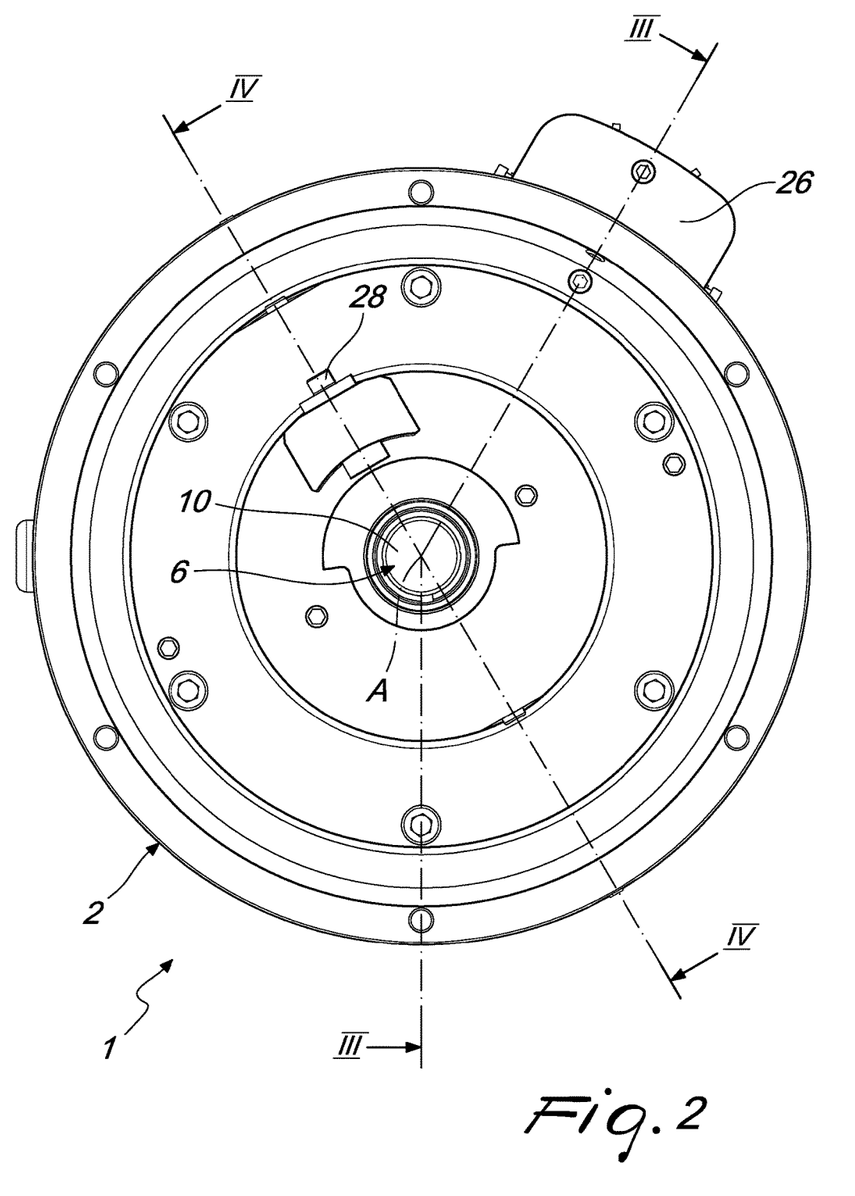
FIG. 2 is a front elevation view of the motovibrator according to the disclosure.
Figure 3:
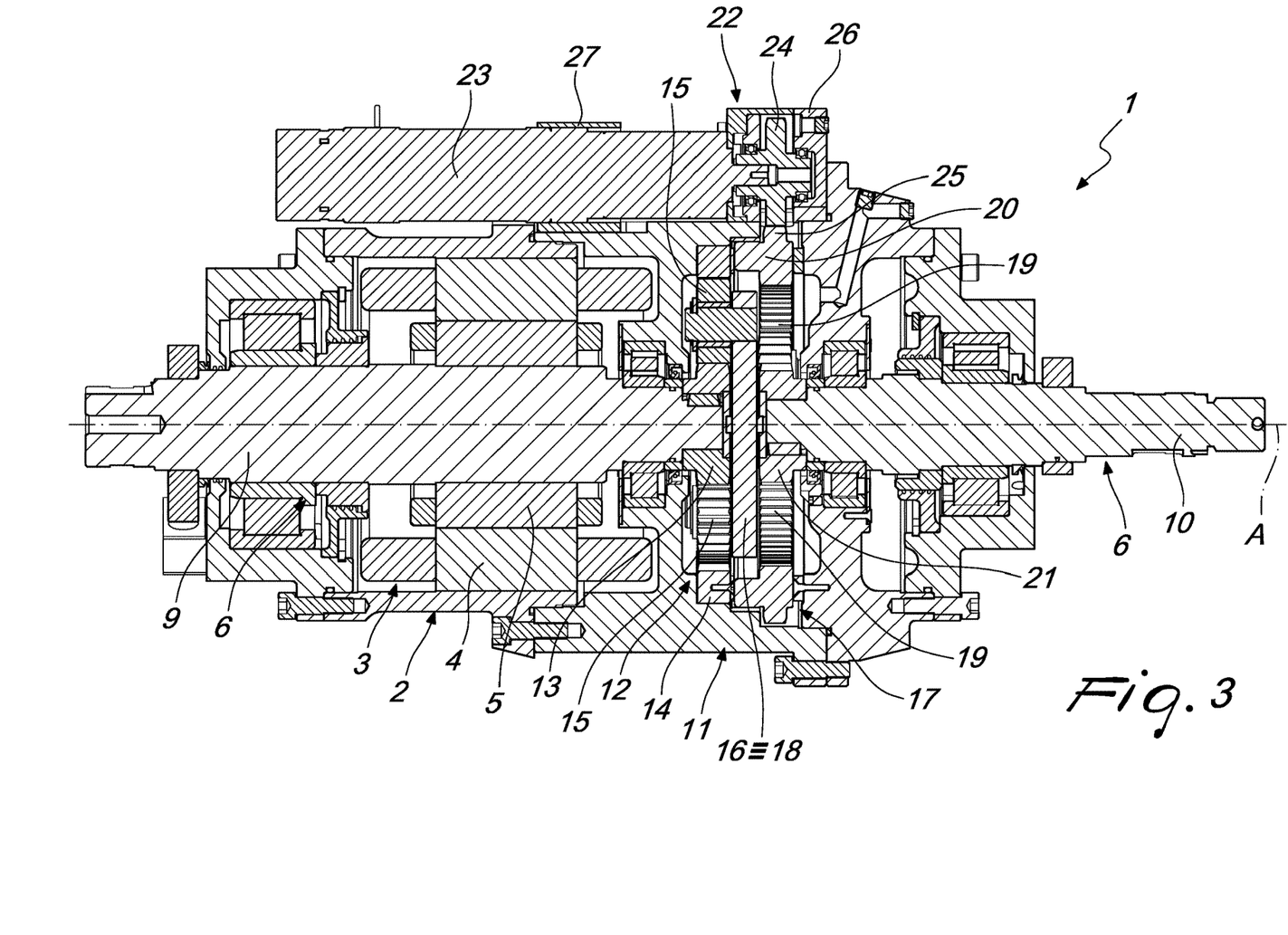
FIG. 3 is a sectional view, taken along the plane III-III of FIG. 2.
Figure 4:
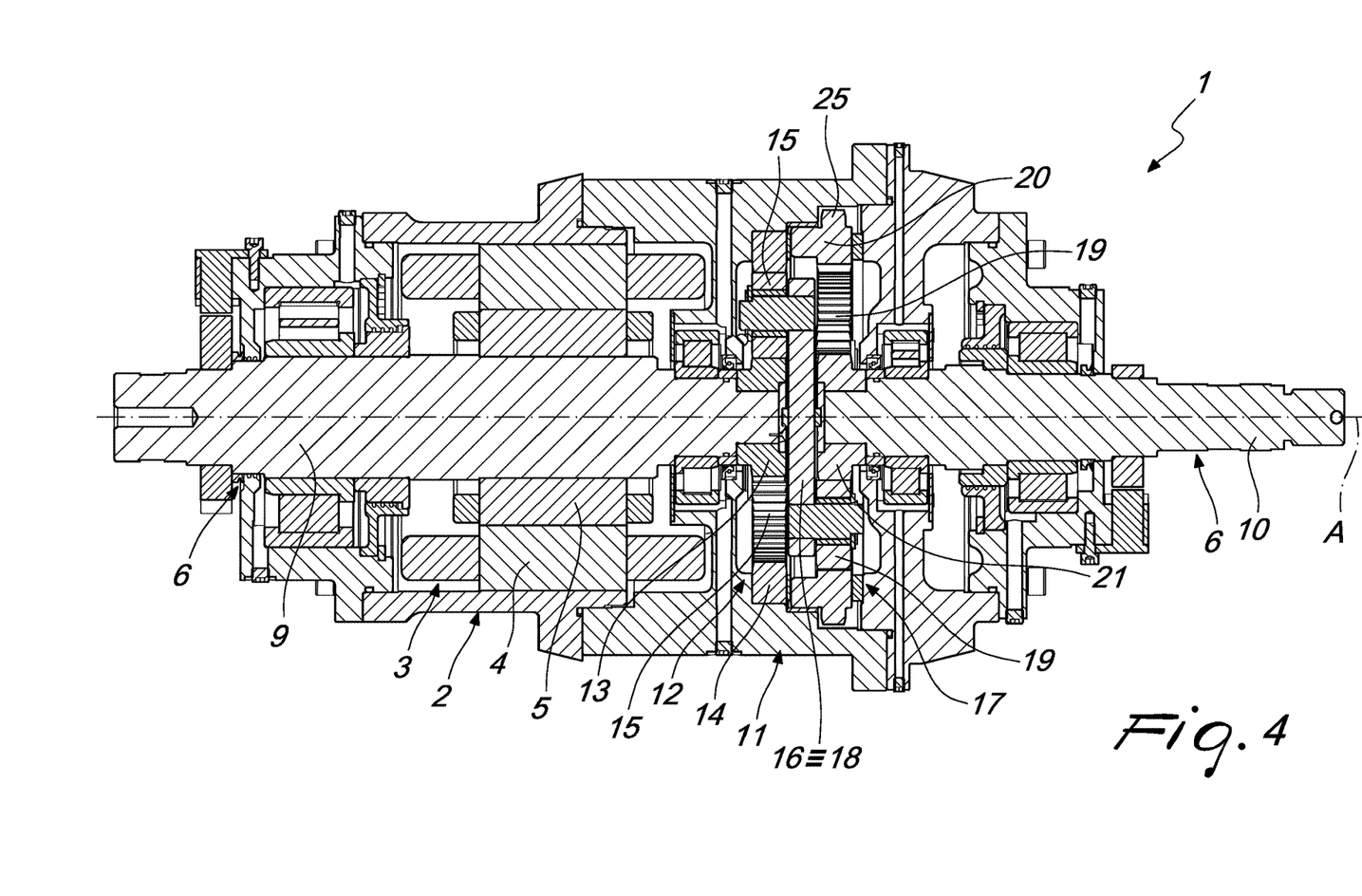
FIG. 4 is a sectional view, taken along the plane IV-IV of FIG. 2.
Figure 5:
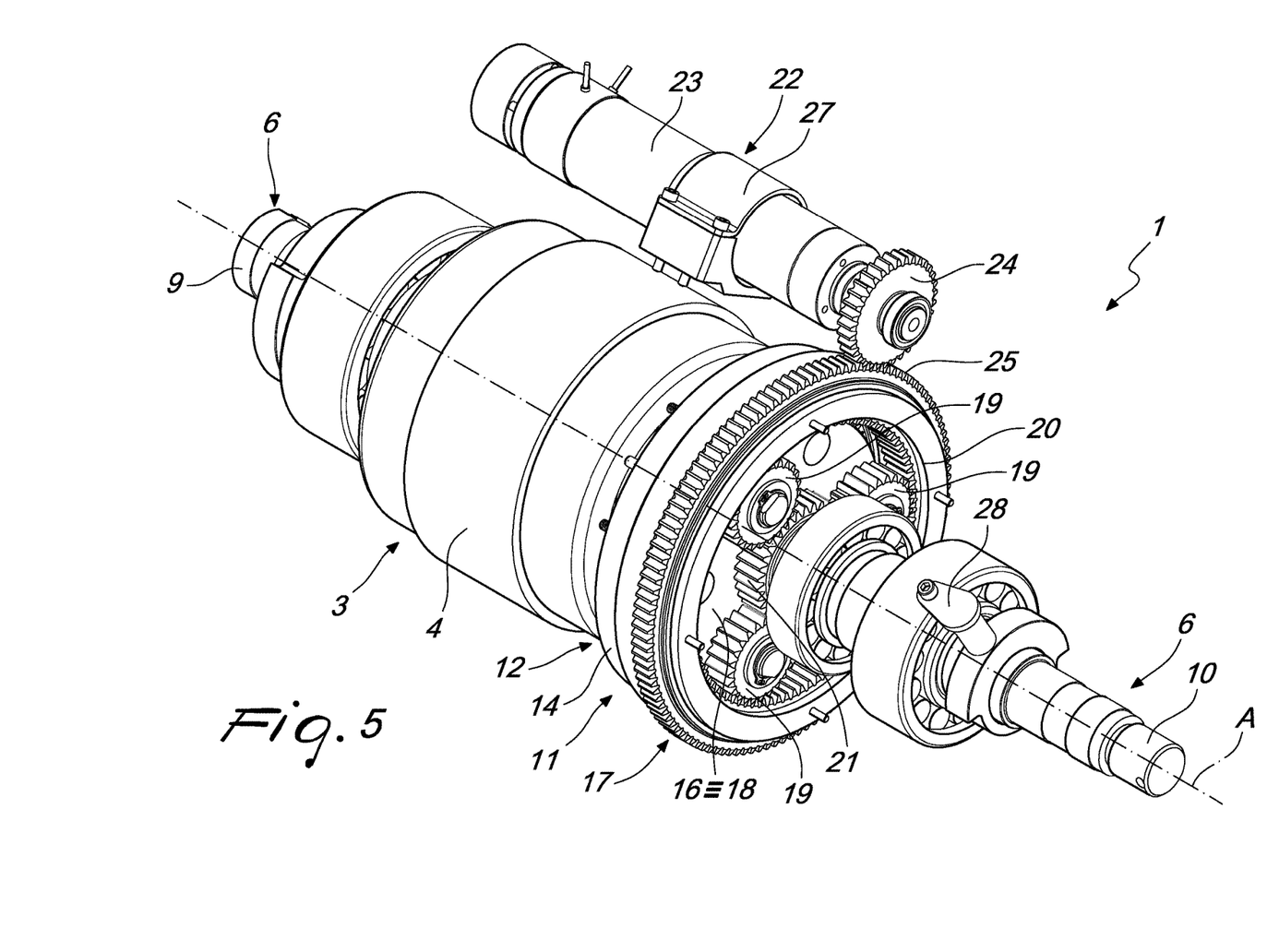
FIG. 5 is a perspective view of the motovibrator according to the disclosure without the containment body.
Figure 6:
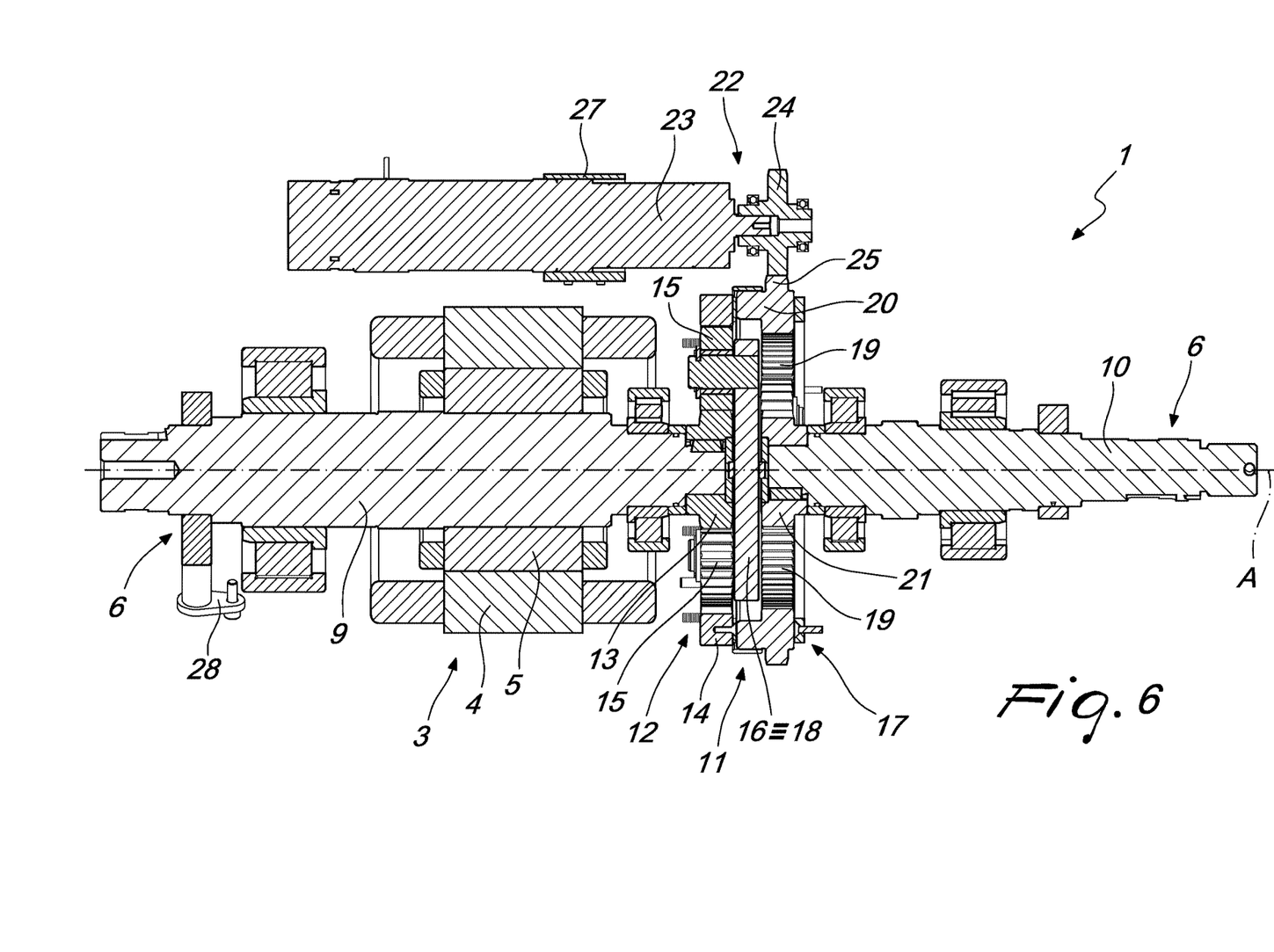
FIG. 6 is a transverse sectional view of FIG. 5.

With particular reference to FIGS. 1-6 cited above, the reference numeral 1 generally designates a motovibrator with continuous adjustment of the angular offset of the eccentric masses.

The motovibrator 1 is particularly suitable for applications in which it is necessary to be able to vary as needed the spatial distribution of the vibrations transmitted to the follower element of the machine in which the motovibrator is incorporated, such as for example machines for screening materials.

The motovibrator 1 comprises a substantially box-like containment body 2, which accommodates electric motor means 3 which comprise a stator 4 which is integral with said body and a rotor 5 for the rotational actuation of a shaft 6 which rotates about a longitudinal axis A.

The stator 4 and/or the rotor 5 are connected to conventional electric power supply means, which are not detailed herein since they are of a known type.

The shaft 6 has mutually opposite ends which protrude from the body 2 and each is associated with at least one respective eccentric mass, not shown in the figures.

The shaft 6 comprises a main section 9 and a secondary section 10 which are mutually aligned along the longitudinal axis A and of which the main section 9 is actuated rotationally directly by the rotor 5 and the secondary section 10 is rotationally actuated by the main section 9 by virtue of transmission means 11 which are interposed between said sections.

The transmission means 11 comprise a first epicyclic stage 12 which is composed of a first sun gear 13 which is rotationally actuated by the main section 9 and a first annular element 14 which is integral with the body 2, between which multiple first planetary gears 15 are meshed which are rotationally supported by a first planet carrier 16 and a second epicyclic stage 17 composed of a second planet carrier 18 which is rotationally actuated by the first planet carrier 16 and supports a plurality of second planetary gears 19 which are interposed between a second annular element 20, which can be actuated rotationally about the longitudinal axis A, and a second sun gear 21, which is rotationally coupled to the secondary section 10.

The first epicyclic stage 12 therefore has the first sun gear 13 as its driving element, rotationally actuated by the main section 9, and the first planet carrier 16 as its follower element.

The second epicyclic stage 17 is instead of the combinatorial type and is provided with two independent driving elements, i.e., the second planet carrier 18 and the second annular element 20, and a follower element, which is constituted by the second sun gear 21 for rotational actuation of the secondary section 10.

In this manner, the rotational actuation of the second annular element 20 is adapted to vary continuously the angular position of the secondary section 10 with respect to the main section 9, consequently modifying the angular offset between the corresponding eccentric masses during the rotation of said sections actuated by the motor means 3.

Typically the eccentric masses are in fact keyed so as to be rotationally integral with the respective sections 9 and 10 by virtue of connection systems of the known type and therefore the angular offset of said masses coincides with the variation of the angular position of the respective sections 9 and 10. Therefore, by modifying the relative angular position of the secondary section 10, in both directions of rotation, with respect to the main section 9 it is possible to adjust the angular offset between the eccentric masses in order to vary accordingly the spatial distribution of the vibrations generated by the rotation of said masses about the longitudinal axis A.

In steady-state operating conditions, i.e., with the second annular element 20 stationary, in order to obtain the same rotation rate of the main section 9 and secondary section 10, the first and second epicyclic stages, respectively 12 and 17, have the same transmission ratio. When the second annular element 20 rotates with a certain angular velocity it is possible to modify (by increasing or decreasing) the output rotation rate of the second sun gear 21 (which is integral with the secondary section 10) with respect to the input rotation rate of the first sun gear 13 (which is integral with the main section 9) by modifying the relative angular arrangement of said sections and of the corresponding eccentric masses.

In particular, given the following values:

$N_1$ input angular velocity of the first sun gear 13;

$N_2$ output angular velocity of the second sun gear 21;

$N_3$ angular velocity of the second annular element 20;

$\tau$ characteristic transmission ratio of the first and second epicyclic stages 12 and 17;

the translation means 11 verify the following relationship:

$$N_2 = N_1 + \frac{1}{\tau} \Box N_3.$$

Advantageously, in order to contain the number of elements that constitute the transmission means 11 and reduce their axial space occupation, the planet carriers 16 and 18 can be formed so as to be mutually integral in a single body constituted by a contoured plate that supports on one side the first planetary gears 15 and on the other side the second planetary gears 19 so that they are mutually angularly offset.

In the embodiment shown, the first and second epicyclic stages 12 and 17 have three respective first and second planetary gears 15 and 19; however, it is not excluded that a different number of planetary gears might be provided for each stage (for example four).

Furthermore, the transmission means 11 are of the type with gears and the first and second stages 12 and 17 use cylindrical gears with straight teeth, but the possibility to use different gears is not excluded.

Furthermore, it is not excluded that the transmission means 11 might use cylindrical friction wheels which constitute the first and second stages 12 and 17 as described above and which transmit rotation by friction.

Inside the body 2 there are elements for the rotational support of the sections 9 and 10 of the type of conventional bearings, which are not described herein in detail since they are of a known type.

Advantageously, the motovibrator 1 is provided with means 22 for actuating the rotation of the second annular element 20 about the longitudinal axis A, which are adapted to rotationally actuate the second annular element 20 in order to vary the relative angular position of the secondary section 10 with respect to the main section 9 and to adjust the angular offset between the corresponding eccentric masses and are suitable to block rotationally said second annular element in order to maintain the desired angular offset.

In a preferred embodiment, the actuation means 22 comprise an auxiliary motor 23 for the rotational actuation of a pinion 24 which is engaged in a set of teeth 25 formed externally to the second annular element 20.

The pinion 24 is supported rotationally about an axis that is parallel to the longitudinal axis A.

The auxiliary motor 23 is of the reversible type and can be actuated electrically, pneumatically or hydraulically. Furthermore, it is supported by the body 2 by means of a collar 27.

In the preferred embodiment, the auxiliary motor 23 is of the electric type and has an electromagnetic brake adapted to be engaged in order to block the rotation of the second annular element 20 once the desired angular offset has been reached.

The pinion 24 is accommodated within an enclosure 26 which is connected to the body 2 and to the casing of the auxiliary motor 23 and is connected to the inside of said body in order to allow coupling to the set of teeth 25.

However, alternative embodiments of the actuation means 22 are not excluded which might provide, for example, a transmission belt that is wound around the second annular element 20 and around a driving pulley which is rotationally actuated by a reversible auxiliary motor, or a transmission of the rotation by friction between a driving friction wheel and the external cylindrical surface of the second annular element 20.

Usefully, the motovibrator 1 can be provided with a pair of angular sensor means 28, each associated with a respective section 9 and 10 and connected in input to an electronic processing unit for the detection of the relative angular offset between said sections and therefore between the corresponding eccentric masses.

The sensor means 28 can be of the inductive, capacitive, magnetic, Hall-effect type, or of the type of relative or absolute encoders.

The electronic processing unit, not shown, is constituted by a conventional programmed or programmable electronic board which is capable of processing the signals that arrive from the sensor means 28 to calculate the current angular offset. This detection can be performed continuously or at a predefined time intervals.

Furthermore, the electronic processing unit can be connected in output to the auxiliary motor 23 or to corresponding control elements, in order to manage automatically its activation/deactivation as a function of the difference/match between the detected angular offset and the desired angular offset, which can be set or stored in the unit itself.

In practice it has been found that the described disclosure achieves the proposed advantages and features, and in particular the fact is stressed that said motovibrator allows the adjustment of the relative angular position of the sections of the shaft and therefore of the angular offset between the corresponding eccentric masses, during the rotation of such sections, without interrupting the operation of the motovibrator and of the machine in which it is incorporated, so as to not penalize its production efficiency.

Furthermore, the motovibrator according to the disclosure does not require the intervention of specialized labor and allows to manage this adjustment in an automated manner, even by means of predefined work cycles.

Not least, the motovibrator according to the disclosure allows to perform an adjustment of the continuous type, so as to optimize its efficiency and flexibility in use.

The disclosure is susceptible of numerous modifications and variations.

All the details may furthermore be replaced with other technically equivalent elements.

In practice, the materials used, as well as the contingent shapes and dimensions, may be any according to the requirements without thereby abandoning the protective scope of the appended claims.

What is claimed is:

1. A motovibrator with continuous adjustment of the angular offset of the eccentric masses, comprising a substantially box containment body which accommodates electric motor means which comprise a stator integral with said body and a rotor for the rotational actuation of a shaft about its own longitudinal axis, the opposite ends of the shaft protruding from the body and being each associated with at least one respective eccentric mass, wherein said shaft comprises a main section and a secondary section mutually aligned along said longitudinal axis, the main section being actuated rotationally directly by said rotor, and are coupled rotationally by interposition of transmission means which comprise a first epicyclic stage provided with a first sun gear rotationally actuated by said main section and a first annular element integral with said body, between which multiple first planetary gears are interposed and supported rotationally by a first planet carrier, and a second epicyclic stage provided with a second planet carrier rotationally actuated by said first planet carrier and supports a plurality of second planetary gears interposed between a second annular element, which can be actuated rotationally about said longitudinal axis, and a second sun gear coupled rotationally to said secondary section, the rotational actuation of the second annular element being adapted to vary continuously the relative angular position of the secondary section with respect to the main section and the angular offset of the corresponding eccentric masses during the rotation of said sections.

2. The motovibrator according to claim 1, wherein said first and second epicyclic stages are provided with the same transmission ratio.

3. The motovibrator according to claim 1, wherein said first and second planet carriers are formed so as to be mutually integral monolithically.

4. The motovibrator according to claim 1, further comprising actuation means for rotationally actuating said second annular element about said longitudinal axis and adapted to actuate the rotation of said second annular element to vary the angular position of said secondary section with respect to the angular position of said main section during the rotation of said sections and block the rotation of said second annular element to maintain the desired offset between said sections.

5. The motovibrator according to claim 4, wherein said actuation means comprise an auxiliary motor for the rotational actuation of a pinion coupled to a set of teeth formed externally to said second annular element.

6. The motovibrator according to claim 1, wherein said eccentric masses are associated so as to be integral in rotation with the respective main section and secondary section, the variation of the relative angular position of said sections coinciding with the variation of the angular offset between the eccentric masses.

7. The motovibrator according to claim 6, further comprising angular sensor means associated with said main section and said secondary section and are connected in input to an electronic processing unit to detect the relative angular offset between said sections.

8. The motovibrator according to claim 5, wherein said electronic unit is connected in output to said auxiliary motor to manage automatically its activation/deactivation as a function of a difference/match between the detected angular offset and a desired angular offset.

9. A machine for screening materials, comprising a motovibrator according to claim 1.

* * * * *